(12) United States Patent
Kim et al.

(10) Patent No.: US 8,570,467 B2
(45) Date of Patent: Oct. 29, 2013

(54) LIQUID CRYSTAL DISPLAY AND THE FABRICATING METHOD OF THE SAME

(75) Inventors: Gee-Bum Kim, Yongin (KR); Won-Sang Park, Yongin (KR); Jae-Hyun Kim, Yongin (KR); Jae-Ik Lim, Yongin (KR); Jong-In Baek, Yongin (KR); Yong-Seok Yeo, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 266 days.

(21) Appl. No.: 13/049,754

(22) Filed: Mar. 16, 2011

(65) Prior Publication Data

US 2012/0147284 A1    Jun. 14, 2012

(30) Foreign Application Priority Data

Dec. 9, 2010   (KR) ................. 10-2010-0125723

(51) Int. Cl.
  *G02F 1/1335*   (2006.01)
(52) U.S. Cl.
  USPC .......................................... 349/115; 349/114
(58) Field of Classification Search
  USPC ................................................ 349/114, 115
  See application file for complete search history.

(56) References Cited

U.S. PATENT DOCUMENTS

| | | | |
|---|---|---|---|
| 6,177,216 B1 * | 1/2001 | Broer et al. | 430/7 |
| 6,597,418 B2 * | 7/2003 | Moon et al. | 349/98 |
| 6,621,543 B2 * | 9/2003 | Moon | 349/115 |
| 6,661,485 B2 * | 12/2003 | Moon | 349/113 |
| 7,079,207 B2 * | 7/2006 | Kashima | 349/115 |
| 7,092,062 B2 * | 8/2006 | Ozawa | 349/152 |
| 7,294,303 B2 * | 11/2007 | Fukuoka et al. | 264/494 |
| 7,535,545 B2 * | 5/2009 | Moon et al. | 349/187 |
| 8,040,475 B2 * | 10/2011 | Ishikawa et al. | 349/115 |
| 8,314,904 B2 * | 11/2012 | Hsieh | 349/113 |
| 2002/0021392 A1 * | 2/2002 | Ohtake et al. | 349/115 |
| 2002/0089623 A1 * | 7/2002 | Moon et al. | 349/98 |
| 2002/0135714 A1 * | 9/2002 | Tatsuta et al. | 349/112 |
| 2002/0167628 A1 * | 11/2002 | Yoon | 349/106 |

(Continued)

FOREIGN PATENT DOCUMENTS

| | | |
|---|---|---|
| KR | 10-2005-0098867 | 10/2005 |
| KR | 10-2006-0018256 | 2/2006 |
| KR | 10-2007-0015633 | 2/2007 |

OTHER PUBLICATIONS

"Reflection & Polarization." Chelix Tech Corp., 2002-2003. Web. May 14, 2013. http://www.chelix.com/technical_reflection.html.*

*Primary Examiner* — Rhonda Peace
(74) *Attorney, Agent, or Firm* — Christie, Parker & Hale, LLP

(57) ABSTRACT

A transflective liquid crystal display (LCD) includes: a first substrate formed with a thin film transistor and a pixel electrode connected to the thin film transistor; a second substrate formed with a common electrode and a color filter and facing the first substrate; a liquid crystal layer formed between the first substrate and the second substrate; a first polarizing plate disposed at one side of the first substrate that does not face the second substrate; a second polarizing plate disposed at one side of the second substrate that does not face the first substrate; a cholesteric film formed on the first substrate; and a backlight unit disposed at one side of the first polarizing plate that does not face the first substrate.

25 Claims, 16 Drawing Sheets

(56) References Cited

U.S. PATENT DOCUMENTS

| | | | |
|---|---|---|---|
| 2003/0038909 A1* | 2/2003 | Ikeno et al. | 349/113 |
| 2003/0081161 A1* | 5/2003 | Ozawa | 349/115 |
| 2003/0128319 A1* | 7/2003 | Maeda | 349/115 |
| 2003/0160924 A1* | 8/2003 | Kashima | 349/115 |
| 2004/0263723 A1* | 12/2004 | Moon et al. | 349/106 |
| 2006/0119783 A1* | 6/2006 | Fukuoka et al. | 349/176 |
| 2009/0027600 A1* | 1/2009 | Hisatake | 349/98 |
| 2010/0225857 A1* | 9/2010 | Lu et al. | 349/98 |
| 2012/0147284 A1* | 6/2012 | Kim et al. | 349/43 |

* cited by examiner

LIQUID CRYSTAL DISPLAY AND THE FABRICATING METHOD OF THE SAME

CROSS-REFERENCE TO RELATED APPLICATION

This application claims priority to and the benefit of Korean Patent Application No. 10-2010-0125723, filed in the Korean Intellectual Property Office on Dec. 9, 2010, the entire content of which is incorporated herein by reference.

BACKGROUND

1. Field

The described technology relates generally to a liquid crystal display (LCD). More particularly, the described technology relates generally to a transflective liquid crystal display (LCD).

2. Description of Related Art

A liquid crystal display (LCD) is slimmer, lighter, and consumes less power than a comparable cathode ray tube (CRT). As a result, the liquid crystal display (LCD) has been prevalently used for midsize and large products such as a monitor and a TV, and small-sized products such as mobile phones, personal digital assistants (Pads), and portable multimedia players (PMPs).

The LCD is a display device that includes a liquid crystal display panel displaying image data using an optical characteristic of liquid crystal. The liquid crystal display panel includes an array panel formed with a thin film transistor (TFT), a color filter panel formed with a color filter (CF), and a liquid crystal interposed therebetween, and the image is displayed by driving and controlling the liquid crystal by an electric field difference between the array panel and the color filter panel.

The liquid crystal display (LCD) may be divided into a transmissive type using light incident from its backlight unit disposed at one side of its liquid crystal display panel, and a reflective type using external light such as solar light.

The reflective type liquid crystal display (LCD) uses only external light incident through the LCD such that power consumption thereof is relatively small compared to the transmissive type liquid crystal display (LCD) using only internal light incident from its backlight unit. Also, when the transmissive type liquid crystal display (LCD) is used outdoors, visibility may be remarkably deteriorated due to external (outer) light such as the solar light. However, in the case of a reflective liquid crystal display (LCD), the outer light is used as the light source such that the reflective liquid crystal display (LCD) may not be used when the outer light is not present.

Therefore, a transflective liquid crystal display (LCD) including both the transmissive type and the reflective type has been proposed. The transflective liquid crystal display (LCD) includes a transmissive part and a reflective part inside the liquid crystal display panel such that the transmissive mode and the reflective mode may be selectively realized. Generally, the transflective liquid crystal display (LCD) includes a step inside the liquid crystal display panel, and thereby a difference of an interval, that is, a cell gap between two substrates of the liquid crystal display panel is generated, and the transmissive mode and the reflective mode are realized by the difference of the cell gap.

However, the transflective liquid crystal display (LCD) generates light leakage due to the step such that light loss is increased, and when a light blocking layer at the step is formed to block the light leakage, the aperture ratio is decreased. Also, the cell gap is not uniform such that an internal structure is complicated, and resultantly the manufacturing process thereof is complicated.

The above information disclosed in this Background section is only for enhancement of understanding of the background of the described technology and therefore it may contain information that does not form the prior art that is already known in this country to a person of ordinary skill in the art.

SUMMARY

The described technology provides a transflective liquid crystal display (LCD) having a uniform cell gap, and a manufacturing method thereof.

A liquid crystal display (LCD) according to an exemplary embodiment includes: a first substrate formed (arranged) with a thin film transistor and a pixel electrode connected to the thin film transistor; a second substrate formed (arranged) with a common electrode and a color filter and facing the first substrate; a liquid crystal layer between the first substrate and the second substrate; a first polarizing plate disposed (located) at one side of the first substrate facing away (e.g., that does not face) the second substrate; a second polarizing plate disposed (located) at one side of the second substrate that does not face the first substrate; a cholesteric film formed on the first substrate; and a backlight unit disposed at one side of the first polarizing plate that does not face the first substrate.

The cholesteric film may include a reflective layer and a transmissive layer, and the reflective layer and the transmissive layer are located at an entire area in (of) one pixel.

The reflectance of the reflective layer of the cholesteric film may be 100%.

The reflectance of the cholesteric film may be 50%.

The first polarizing plate and the second polarizing plate may respectively change incident light into different circular polarization directions.

The cholesteric film may be disposed between the thin film transistor and the pixel electrode, and the cholesteric film may have a hole to connect the thin film transistor and the pixel electrode.

The liquid crystal display (LCD) may further include a ¼ wavelength plate and a cholesteric reflective plate disposed between the first polarizing plate and the backlight unit.

The reflectance of the cholesteric reflective plate may be 100%.

The liquid crystal display (LCD) may further include a protective layer formed on the thin film transistor, and an organic layer formed on the protective layer.

The liquid crystal display (LCD) may further include a diffusion layer formed between the second substrate and the second polarizing plate.

The color filter may include light diffusion particles.

The liquid crystal layer may be an electrically controlled birefringence (ECB) mode liquid crystal layer, a vertical alignment (VA) mode liquid crystal layer, an optically compensated birefringence (OCB) mode liquid crystal layer, or a hybrid aligned nematic (HAN) mode liquid crystal layer.

A method for manufacturing a liquid crystal display (LCD) according to an exemplary embodiment includes: forming a thin film transistor on a first substrate; forming a cholesteric film on the thin film transistor; forming a hole in the cholesteric film; forming a pixel electrode connected to the thin film transistor through the hole; forming a color filter and a common electrode on a second substrate; injecting a liquid crystal contacting the first substrate and the second substrate and between the first substrate and the second substrate; disposing a first polarizing plate at one side of the first substrate facing away (e.g., that does not face) the second substrate; disposing a second polarizing plate at one side of the second substrate that does not face the first substrate; and disposing a backlight unit at one side of the first polarizing plate that does not face the first substrate.

The cholesteric film may be formed by irradiating ultraviolet (UV) light to a reactive mesogen and by heat-treating it.

The ultraviolet (UV) light may be selectively irradiated to the reactive mesogen to form a reflective layer and a transmissive layer.

The reflective layer and the transmissive layer may be formed at entire area in (of) one pixel.

A ¼ wavelength plate and a cholesteric reflective plate may be disposed between the first polarizing plate and the backlight unit.

The reflectance of the reflective layer may be 100%.

The reflectance of the cholesteric film may be 50%.

A protective layer may be formed on the thin film transistor, and an organic layer may be formed on the protective layer.

A diffusion layer may be formed between the second substrate and the second polarizing plate.

Light diffusion particles may be formed in the color filter.

According to an exemplary embodiment, the liquid crystal display (LCD) has a uniform cell gap such that the aperture ratio may be increased.

Also, the opening area is increased such that the luminance may be improved.

Further, the transflective liquid crystal display (LCD) may be manufactured through a simple method.

DETAILED DESCRIPTION OF THE EMBODIMENTS

Figure 1:
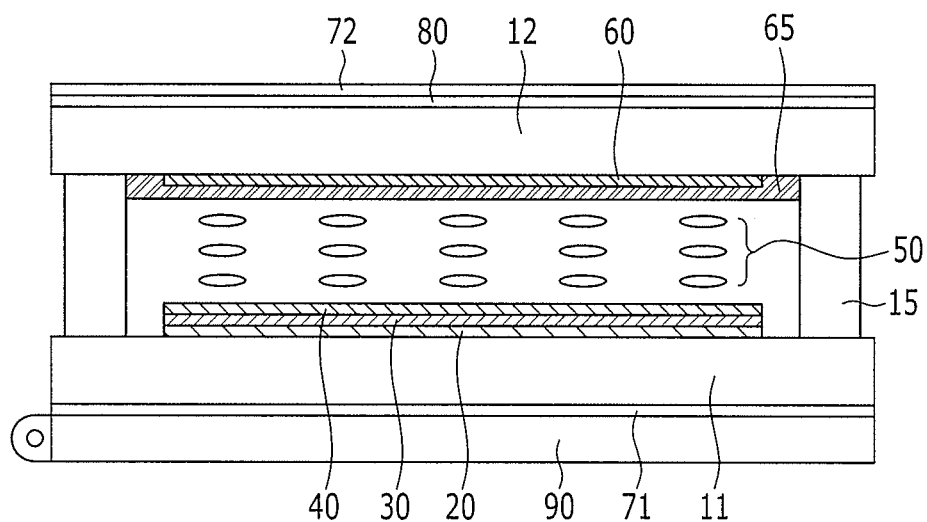
FIG. 1 is a schematic diagram of a liquid crystal display (LCD) according to a first exemplary embodiment.

The present invention will be described more fully hereinafter with reference to the accompanying drawings, in which exemplary embodiments of the invention are shown.

The drawings and description are to be regarded as illustrative in nature and not restrictive. Like reference numerals designate like elements throughout the specification. In addition, the size and thickness of each component shown in the drawings are arbitrarily shown for better understanding and ease of description, but the present invention is not limited thereto.

It is to be understood that when an element such as a layer, film, region, or substrate is referred to as being "on" another element, it can be directly on the other element or intervening elements may also be present.

Figure 2:
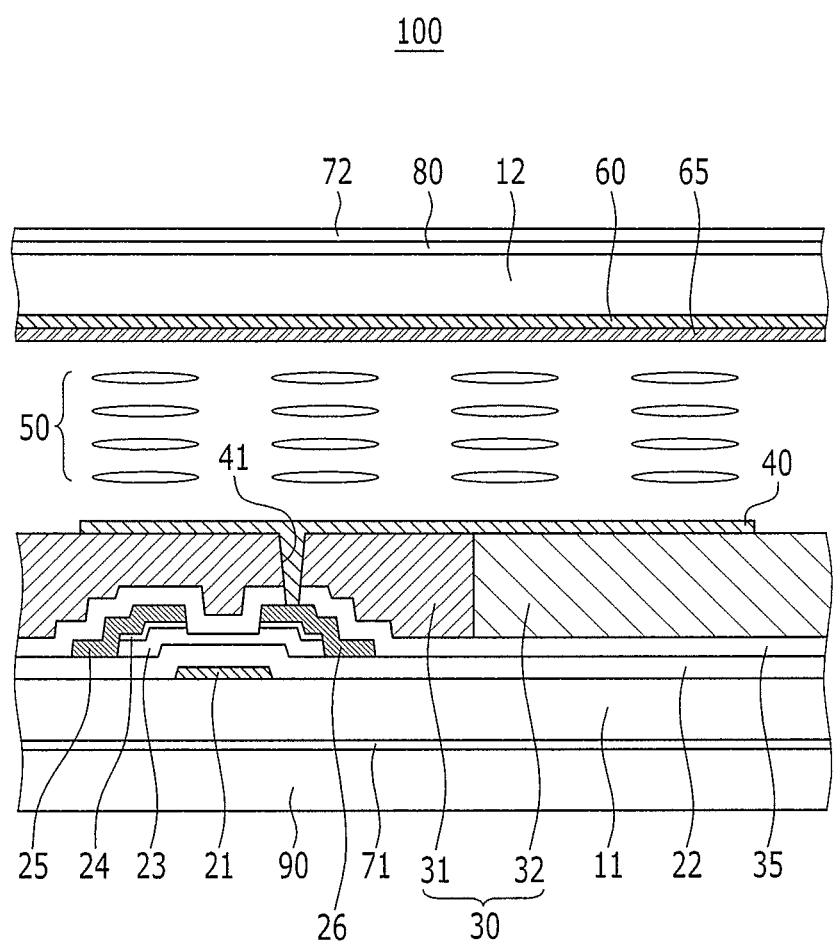
FIG. 2 is an enlarged cross-sectional view of a liquid crystal display (LCD) according to the first exemplary embodiment.

FIG. 1 is a schematic diagram of a liquid crystal display (LCD) according to a first exemplary embodiment, and FIG. 2 is an enlarged cross-sectional view of a liquid crystal display (LCD) according to the first exemplary embodiment. A liquid crystal display (LCD) according to the present exemplary embodiment will be described with reference to them.

Referring to FIG. 1 and FIG. 2, a liquid crystal display (LCD) 100 includes a liquid crystal display panel and a backlight unit 90. The liquid crystal display panel includes a first substrate 11, a second substrate 12 facing the first substrate 11, and a liquid crystal layer 50 formed between the first substrate 11 and the second substrate 12, and the backlight unit 90 is disposed under the first substrate 11.

The first substrate 11 and the second substrate 12 may be formed of transparent glass for internal light emitted from the backlight unit 90 and outer (external) light such as a natural light (e.g., solar or sun light) to be transmitted, and they are mutually combined by a sealing member 15 that is formed according to an outer perimeter thereof. A thin film transistor 20 and a pixel electrode 40, connected to the thin film transistor 20, are formed on the first substrate 11 and a common electrode 65 is formed on the second substrate 12, and when voltages are applied to the pixel electrode 40 and the common electrode 65, an electric field is formed therebetween such that the liquid crystal layer 50 is driven.

In more detail, also referring to FIG. 2, a gate electrode 21, a gate insulating layer 22, a semiconductor layer 23, and an ohmic contact layer 24 are sequentially formed on the first substrate 11. Also, a source electrode 25 and a drain electrode 26 are formed on the ohmic contact layer 24 and on the gate insulating layer 22, and a protective layer 35 is formed on the thin film transistor 20.

A cholesteric film 30 is formed on the thin film transistor 20 and the protective layer 35. The cholesteric film 30 includes a reflective layer 31 and a transmissive layer 32, having a function selectively reflecting one of either left circular polarized light or right circular polarized light, and the cholesteric film 30 will be described in more detail later.

In the present specification, light that is rotated in a clockwise direction is referred to as left circular polarized light, and a light that is rotated in a counterclockwise direction is referred to as a right circular polarized light.

A pixel electrode 40 is formed on the cholesteric film 30. The pixel electrode 40 is connected to the drain electrode 26 of the thin film transistor 20 through a via hole 41 formed in the cholesteric film 30 and the protective layer 35, thereby receiving an electrical signal.

The common electrode 65 facing the pixel electrode 40 is formed on the second substrate 12, and when voltages are applied to the pixel electrode 40 on the first substrate 11 and the common electrode 65 on the second substrate 12, an electric field is formed and the liquid crystal layer 50, formed between the first substrate 11 and the second substrate 12, is accordingly driven.

In one embodiment, the pixel electrode 40 and the common electrode 65 are formed of a transparent material such as indium tin oxide (ITO) or indium zinc oxide (IZO) for light to be transmitted.

In the present exemplary embodiment, liquid crystal molecules of the liquid crystal layer 50 maintain a horizontal state when the electric field is not formed, and are vertically aligned, thereby being operated as an electrically controlled birefringence (ECB) mode when the electric field is formed. However, the present invention is not limited thereto, and the liquid crystal layer 50 may be formed with a vertically aligned (VA) mode wherein it maintains a vertical state when the electric field is not formed, and is vertically aligned when the electric field is formed. Also, various other modes such as an optically compensated birefringence (OCB) mode or a hybrid aligned nematic (HAN) mode may be formed.

A color filter 60 is formed on the second substrate 12. The color filter 60 for filtering light from white color light that is transmitting through the liquid crystal layer 50, to a desired color light, uses three primary color filters of red (R), green (G), and blue (B) for one pixel. A uniform color is realized through an additive color mixture while either the internal light that is emitted from the backlight unit 90 and transmitted through the cholesteric film 30, or the outer light that is incident from the outside and reflected by the cholesteric film 30, is passed through the color filter 60. Here, the color filter 60 in the present exemplary embodiment may be formed by using a color photoresist.

A polarizing plate 70 is formed to have a first polarizing plate 71 at one side of the first substrate 11 and a second polarizing plate 72 at one side of the second substrate 12. The polarizing plate 70 formed at one side of the first substrate 11 and the second substrate 12 as the circular polarizing plate may be formed by a combination of a linear polarizing plate and a ¼ wavelength plate. The light passing through the polarizing plate 70 is rotated in the clockwise direction or in the counterclockwise direction. That is, the polarizing plate 70 changes the incident light into the left circular polarized light or the right circular polarized light.

In the present exemplary embodiment, the polarizing plate 70 includes the first polarizing plate 71 and the second polarizing plate 72. The first polarizing plate 71 and the second polarizing plate 72 are respectively positioned under the first substrate 11 and on the second substrate 12, thereby changing the incident light into circular polarized light of different directions. That is, if the first polarizing plate 71 changes the incident light into the left circular polarized light, then the second polarizing plate 72 changes the incident light into the right circular polarized light, and if the first polarizing plate 71 changes the incident light into the right circular polarized light, then the second polarizing plate 72 changes the incident light into the left circular polarized light.

A diffusion layer 80 to improve the viewing angle is formed between the second substrate 12 and the second polarizing plate 72 in the present exemplary embodiment. The light incident to the side of the second substrate 12 generates a mirror reflection in the cholesteric film 30 such that the light is not diffused in all directions, and the viewing angle may become narrow. However, in the present exemplary embodiment, the light reflected from the cholesteric film 30 is passed through the diffusion layer 80 such that the problem due to the mirror reflection may be solved and the viewing angle may be improved.

The backlight unit 90 includes a light source and a light guide plate. As the light source, a light emitting diode (LED) may be used, and this may be mounted to a printed circuit film and may be disposed at one side of the light guide plate. Here, the number of light sources used may be variously changed according to a usage and a size of the liquid crystal display (LCD) 100, and the light source may be disposed under a guide plate if necessary. The light emitted from the light source is incident to the light guide plate, and the light guide plate guides the light to uniformly diffuse the light onto the entire surface of the light guide plate.

Also, an optical sheet may be disposed between the liquid crystal display panel and the backlight unit 90. The optical sheet may include a diffusion sheet, a prism sheet, a protection sheet, etc., and thereby the light passing through the light guide plate of the backlight unit is incident in the direction vertical to the liquid crystal display panel. Also, a reflection sheet may be further disposed under the backlight unit 90. When the reflection sheet is disposed, the reflection sheet reflects the light emitted to the lower surface of the light guide plate toward the optical sheet, and thereby the light loss may be reduced or minimized.

Figure 3A:
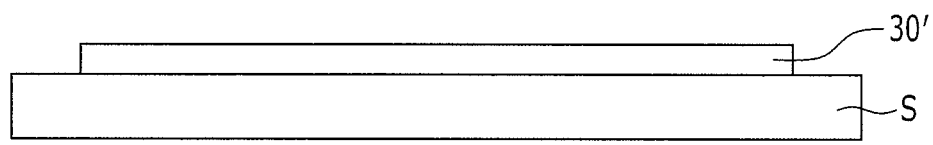
FIG. 3A to FIG. 3C are views schematically showing a process of forming a cholesteric film of a liquid crystal display (LCD) according to the first exemplary embodiment.
Figure 3B:
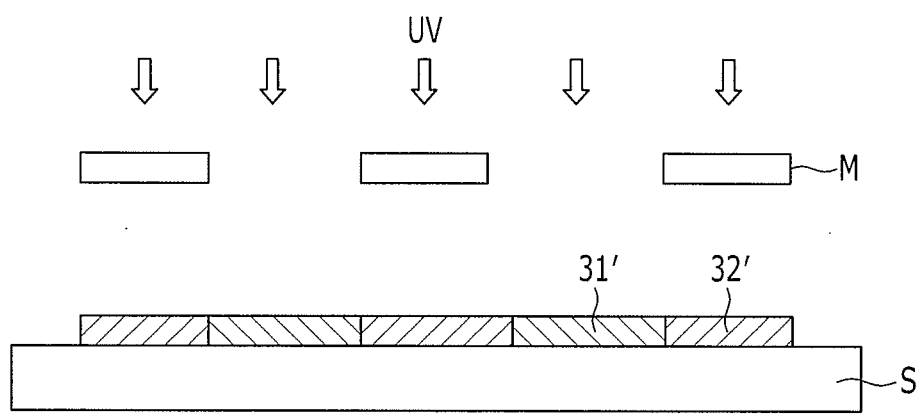
Figure 3C:
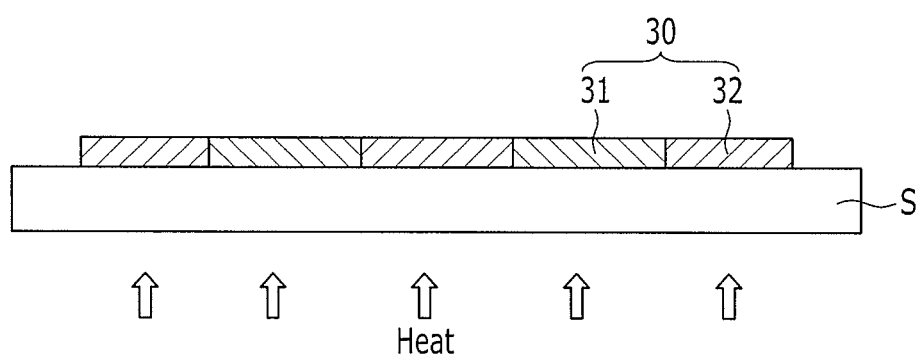

FIG. 3A to FIG. 3C are views schematically showing a process of forming a cholesteric film of a liquid crystal display (LCD) according to the first exemplary embodiment. Hereafter, a manufacturing method of a cholesteric film and a characteristic thereof according to the present exemplary embodiment will be described with reference to these.

Referring to FIG. 3A, a reactive mesogen 30' having a nematic phase is coated on a substrate S. In the present exemplary embodiment, the reactive mesogen 30' used to form the cholesteric film 30 includes a mesogen that is capable of exhibiting liquid crystal properties and an end group that is capable of being polymerized, meaning a monomer molecule having a liquid crystal phase.

Referring to FIG. 3B, ultraviolet (UV) light is irradiated to the reactive mesogen 30' coated on the substrate S. When the ultraviolet (UV) light is irradiated, an irradiation region of the ultraviolet (UV) light may be selected by using a mask M. The reactive mesogen is hardened in the region where the ultraviolet (UV) light is irradiated to form a hardening region 31', and the reactive mesogen is not hardened in the region where the ultraviolet (UV) light is not irradiated to form a non-hardening region 32'.

Referring to FIG. 3C, heat is applied to the entire hardening region 31' and non-hardening region 32', thereby completing the cholesteric film 30. As described above, the cholesteric film 30 includes a reflective layer 31 and a transmissive layer 32, and referring to FIG. 3C, a reflective layer 31 (having refractive index anisotropy) is formed at the region where the ultraviolet (UV) light is irradiated to the reactive mesogen, and the transmissive layer 32 (having a refractive index isotropy ultraviolet (UV) light) is formed at the region where the ultraviolet (UV) light is not irradiated.

The reflective layer 31 of the cholesteric film 30 has a characteristic of reflecting the incident light of a special polarization state by the refractive index anisotropy. In more detail, the reflective layer 31 of the cholesteric film 30 has the right circular or left circular polarization direction. Here, when the polarization direction of the incident light accords (corresponds and matches) with the polarization direction of the reflective layer 31, the reflective layer 31 reflects the incident light, but when the polarization directions do not accord, the incident light is passed as it is. Here, the thickness of the reflective layer 31 is controlled to control reflectance, and in the present exemplary embodiment, the reflective layer 31 is formed to reflect the incident light according to the polarization direction of the reflective layer 31 at 100%.

Differently from the reflective layer 31, the transmissive layer 32 of the cholesteric film 30 does not have the refractive index anisotropy and the special polarization direction, thereby having a function of transmitting the incident light as it is.

A manufacturing process of the cholesteric film 30 is similar to a manufacturing process of an organic layer formed on a protective layer such that a transflective mode of the liquid crystal display (LCD) 100 may be realized by using the manufacturing process of the organic layer formed on the protective layer.

Figure 4A:
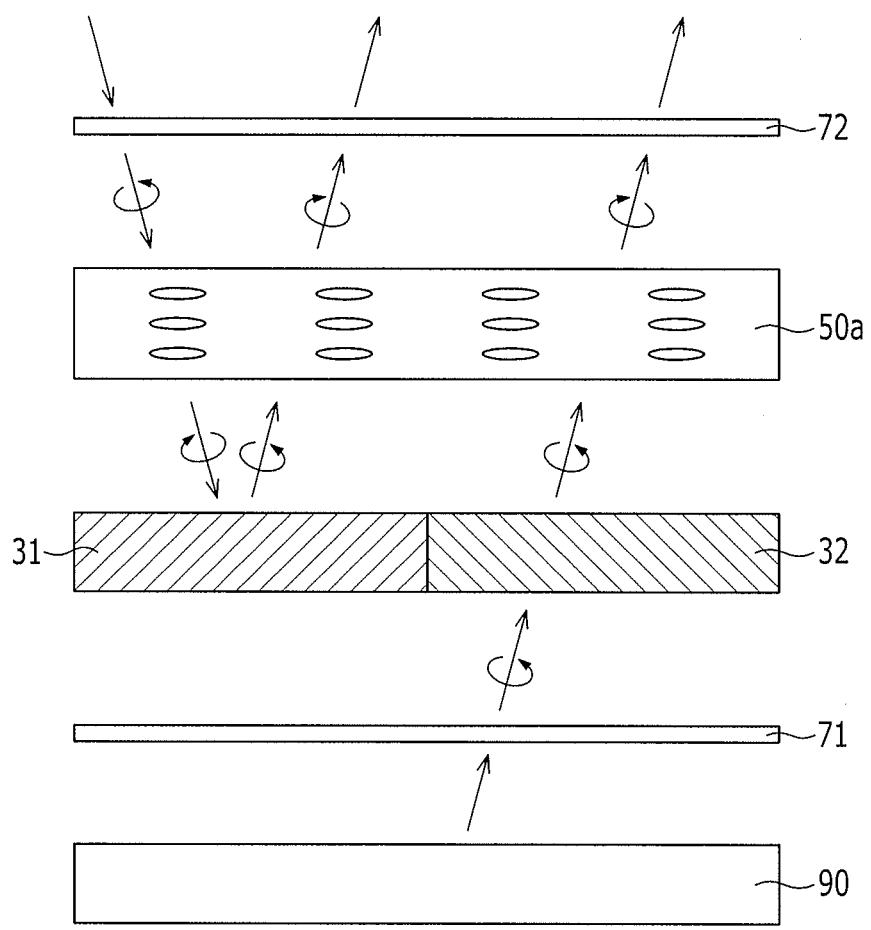
FIG. 4A and FIG. 4B are cross-sectional views schematically showing a reflective mode and a transmissive mode of a liquid crystal display (LCD) according to the first exemplary embodiment.
Figure 4B:
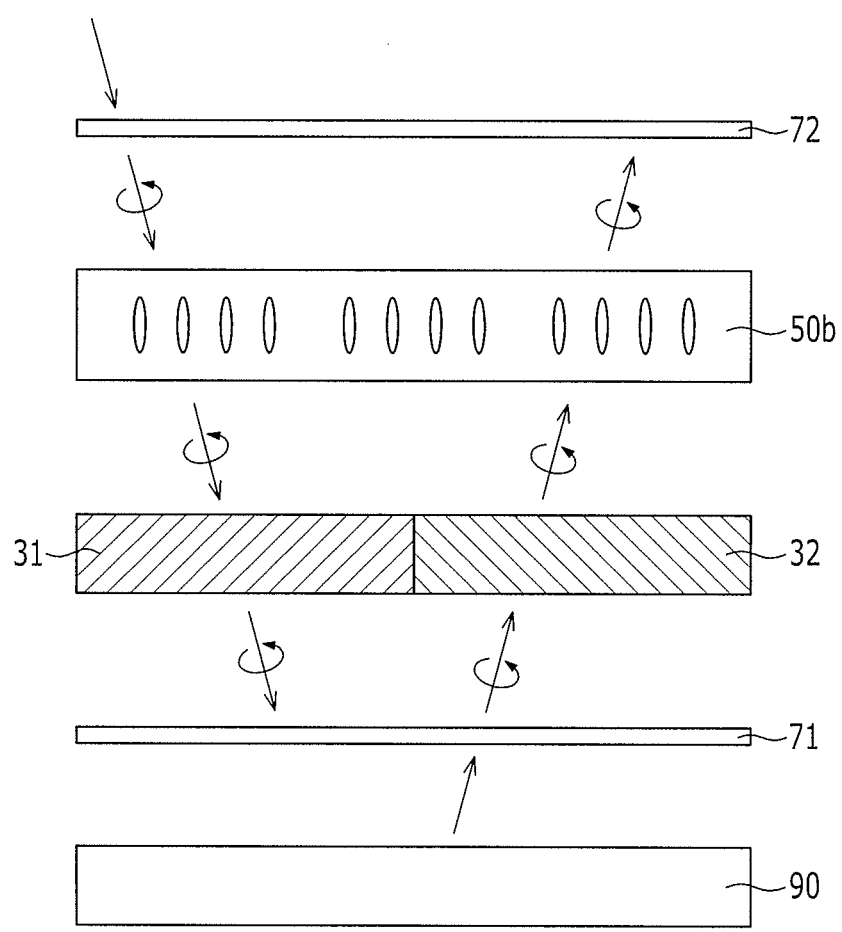

FIG. 4A and FIG. 4B are cross-sectional views schematically showing a reflective mode and a transmissive mode of a liquid crystal display (LCD) according to the first exemplary embodiment. An operation of a transflective mode of a liquid crystal display (LCD) according to the present exemplary embodiment will be described with reference to these.

In the present exemplary embodiment, the first polarizing plate 71 and the second polarizing plate 72 respectively change the incident light into the left circular polarized light and the right circular polarized light, and the reflective layer 31 of the cholesteric film has the characteristic of reflecting the left circular polarized light. However, the present invention is not limited thereto, and the first polarizing plate and the second polarizing plate may respectively change the incident light into the right circular polarized light and the left circular polarized light, and the reflective layer of the cholesteric film may have the characteristic of reflecting the right circular polarized light.

FIG. 4A shows a white state in which a liquid crystal layer 50a is horizontally aligned, wherein the left side shows a path of external light incident from the outside of the liquid crystal display (LCD), and the right side shows a path of internal light emitted from the inside the liquid crystal display (LCD).

Firstly, referring to the path of the external light, a portion of the external light is changed into the right circular polarized light while passing through the second polarizing plate 72 positioned on the second substrate. The liquid crystal layer 50a that is horizontally aligned between the two substrates functions as a phase retardation plate such that the right circular polarized light incident to the liquid crystal layer 50a is changed into the left circular polarized light while passing through it. As described above, the external light that is changed into the left circular polarized light while passing through the second polarizing plate 72 and the liquid crystal layer 50a is reflected by the reflective layer 31 of the cholesteric film 30. In the present exemplary embodiment, the reflectance of the reflective layer 31 is 100%, all the external light incident to the internal of the liquid crystal display (LCD) is reflected by the reflective layer 31.

When the external light is reflected by the reflective layer 31, phase retardation is not generated and the external light that is reflected as left circular polarized light is changed into the right circular polarized light while passing through the liquid crystal layer 50a. The external light that is changed into the right circular polarized light, is passed through the color filter and the second substrate, and is then emitted through the second polarizing plate 72 to the outside.

Referring to the path of the internal light, the internal light that is emitted from the backlight unit 90 disposed under the first substrate, is changed into the left circular polarized light while the portion thereof is passed through the first polarizing plate 71. The internal light that is changed into the left circular polarized light is passed through the transmissive layer 32 of the cholesteric film 30 as it is, and is changed into the right circular polarized light while passing through the liquid crystal layer 50a that is horizontally aligned. In this way, the internal light that is changed into the right circular polarized light through the first polarizing plate 71 and the liquid crystal layer 50a, is passed through the color filter and the second substrate, and is then emitted outside through the second polarizing plate 72.

As described above, in the white state in which the liquid crystal layer 50a is horizontally aligned, the external light is passed through the second polarizing plate 72 and is reflected by the reflective layer 31 of the cholesteric film 30; and the internal light is passed through the first polarizing plate 71 and the transmissive layer 32 of the cholesteric film 30; and both the external light and the internal light are then emitted to the side of the second substrate such that the external light that is reflected and the internal light that is passed in one pixel may all be used.

FIG. 4B shows a black state in which the liquid crystal layer 50b is vertically aligned, wherein the path of the external light incident from the outside of the liquid crystal display (LCD) is shown at the left side, and the path of the internal light emitted from the inside of the liquid crystal display (LCD) is shown at the right side.

Firstly, referring to the path of the external light, a portion of the external light is changed into the right circular polarized light while passing though the second polarizing plate 72 positioned on the second substrate, and the external light (changed into the right circular polarized light) is passed through the liquid crystal layer 50b that is vertically aligned between the two substrates as it is. Here, the phase retardation is not generated for the external light passing through the liquid crystal layer 50b. As described above, the external light that is changed into the right circular polarized light while passing through the second polarizing plate 72 and the liquid crystal layer 50b, does not accord (not correspond and match) with the polarization direction of the reflective layer 31 of the cholesteric film 30, such that it is passed through the reflective layer 31 as it is. Also, the external light is passed through the reflective layer 31 (changed into the right circular polarized light), and it is not passed through the first polarizing plate 71.

Referring to the internal light, a portion of the internal light that is emitted from the backlight unit 90 positioned under the first substrate, is changed into the left circular polarized light while passing through the first polarizing plate 71. The internal light of the left circular polarization is transmitted through the transmissive layer 32 of the cholesteric film 30 as it is, and is passed through the liquid crystal layer 50b that is vertically aligned as it is without the phase retardation. In this way, the internal light that is changed into the left circular polarized light through the first polarizing plate 71 and the liquid crystal layer 50b, is not passed through the second polarizing plate 72 such that it is not emitted outside the second substrate.

As described above, in the black state in which the liquid crystal layer 50b is vertically aligned, all external and internal light is not emitted toward the second substrate such that the image is not realized.

Also, in the present exemplary embodiment, the liquid crystal layer may be operated with an ECB mode, that is the white state in the off state when the electric field is not formed between the two substrates, or may be operated with a VA mode, that is the white state in the on state when the electric field is formed between the two substrates.

In the present exemplary embodiment, the cholesteric film 30 including the reflective layer 31 and the transmissive layer 32 are formed (located) at (on or in) the entire area (and, e.g., as part of a same layer) of (in) each pixel of the liquid crystal display (LCD) 100, and thereby the external light such as the solar light may be reflected by the reflective layer 31 and the internal light emitted from the backlight unit 90 may be transmitted through the transmissive layer 32. That is, the liquid crystal display (LCD) 100 according to the present exemplary embodiment may be operated with the transflective mode in which the reflection and the transmission are simultaneously or concurrently realized.

Also, the reflection portion and the transmission portion are formed without the step such that a uniform interval, that is, a uniform cell gap, may be maintained between the two substrates. Resultantly the light leakage may be prevented, the light loss may be reduced, and the additional light block layer is not necessary such that the reduction of the aperture ratio may be prevented.

Hereinafter, a liquid crystal display (LCD) according to other exemplary embodiments will be described with reference to FIG. 5 to FIG. 14. For the description of other exemplary embodiments, descriptions of the same configurations as in the first exemplary embodiment are simplified or omitted.

Figure 5:
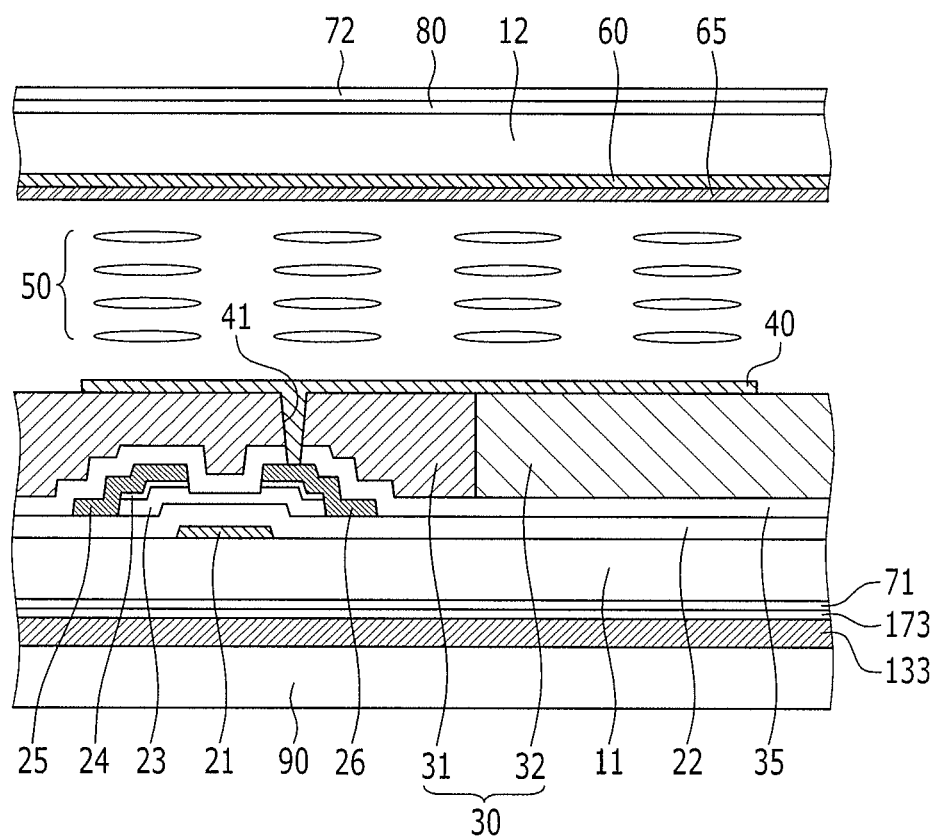
FIG. 5 is an enlarged cross-sectional view of a liquid crystal display (LCD) according to a second exemplary embodiment.

FIG. 5 is an enlarged cross-sectional view of a liquid crystal display (LCD) according to a second exemplary embodiment.

Referring to FIG. 5, a liquid crystal display (LCD) 101 has the same structure as the liquid crystal display (LCD) 100 of the first exemplary embodiment except for a ¼ wavelength plate 173 and a cholesteric reflective plate 133 disposed under the first substrate 11.

The ¼ wavelength plate 173 that changes the polarization direction of the incident light by 90 degrees is disposed under the first polarizing plate 71, and the cholesteric reflective plate 133 is disposed between the ¼ wavelength plate 173 and the backlight unit 90.

The cholesteric reflective plate 133 may be manufactured through a similar method to the cholesteric film 30. In more detail, to reflect the incident light of a set or predetermined polarization direction throughout the entire region of the cholesteric reflective plate 133, the cholesteric reflective plate 133 is formed to have refractive index anisotropy like the reflective layer 31 of the cholesteric film 30. Also, the thickness of the cholesteric reflective plate 133 is controlled to realize the reflectance of 100%.

The light efficiency of the incident light passing through the transmissive layer 32 of the cholesteric film 30 may be improved through the configuration further including the ¼ wavelength plate 173 and the cholesteric reflective plate 133, and this will be described in more detail.

Figure 6:
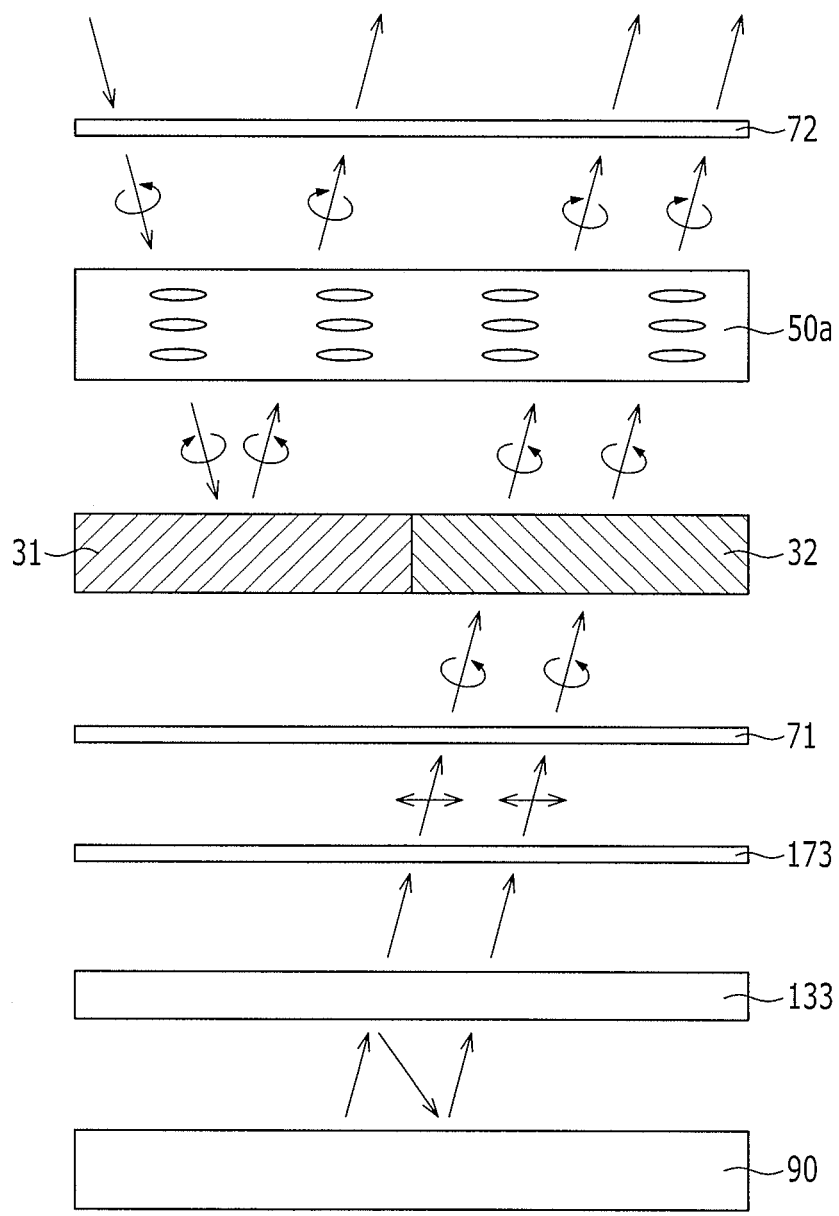
FIG. 6 is a cross-sectional view schematically showing a reflective mode and a transmissive mode of a liquid crystal display (LCD) according to the second exemplary embodiment.

FIG. 6 is a cross-sectional view schematically showing a reflective mode and a transmissive mode of a liquid crystal display (LCD) according to the second exemplary embodiment. An operation of a transflective mode of a liquid crystal display (LCD) according to the present exemplary embodiment will be described with reference to these.

In the present exemplary embodiment, like the first exemplary embodiment, the first polarizing plate 71 and the second polarizing plate 72 respectively change the incident light into the left circular polarized light and the right circular polarized light, and the reflective layer 31 of the cholesteric film has the characteristic of reflecting the left circular polarized light.

FIG. 6 shows a white state in which the liquid crystal layer 50a is horizontally aligned, wherein the path of external light incident from the outside of the liquid crystal display (LCD) is shown at the left side, and the path of internal light emitted from the inside of the liquid crystal display (LCD) is shown at the right side.

In the present exemplary embodiment, the configuration of the second polarizing plate 72 and the cholesteric film 30 is the same as that of the first exemplary embodiment such that the path of the external light incident from the outside is also the same as the path of the external light in the first exemplary embodiment.

Referring to the internal light in the present exemplary embodiment, the internal light emitted from the backlight unit 90 is emitted toward the cholesteric reflective plate 133. The cholesteric reflective plate 133 in the present exemplary embodiment has the characteristic of reflecting the incident light of the set or predetermined polarization direction, and in more detail, the left circular polarized light. Accordingly, the left circular polarized light among the internal light incident from the backlight unit 90 is again reflected to the backlight unit 90 and the rest of the internal light is transmitted through the cholesteric reflective plate 133 as it is.

The portion of the left circular polarized light reflected by the cholesteric reflective plate 133 among the internal light is reflected by the optical sheet disposed on the backlight unit 90 or by the backlight unit 90 itself, and then is again progressed toward the cholesteric reflective plate 133. In this process, the phase of the left circular polarized light is changed, and therefore the internal light reflected by the backlight unit 90 or the optical sheet is transmitted through the cholesteric reflective plate 133. At this time, the light that is reflected by the backlight unit 90 and is transmitted through the cholesteric reflective plate 133, is in the range of 30-50% of the left circular polarized light reflected by the cholesteric reflective plate 133.

The internal light transmitting through the cholesteric reflective plate 133 is changed into the linear polarized light of the same direction as the transmissive axis of the first polarizing plate 71 while passing through the ¼ wavelength plate 173, and then is again changed into the left circular polarized light while passing through the first polarizing plate 71. When the light passing through the cholesteric reflective plate 133 is directly passed through the first polarizing plate 71 (without the cholesteric reflective plate 133 and the ¼ wavelength plate 173), the luminance of the light is decreased by half by the first polarizing plate 71, however the ¼ wavelength plate 173 of the present exemplary embodiment has the function of passing the light, passing through the cholesteric reflective plate 133, through the polarizing plate 71 without the luminance loss.

The internal light passing through the ¼ wavelength plate 173 and the first polarizing plate 71 is transmitted through the transmissive layer 32 of the cholesteric film, as it is. The internal light passing through the transmissive layer 32 is changed into the right circular polarized light while passing through the liquid crystal layer 50a that is horizontally aligned, and is emitted outside through the second polarizing plate 72, the color filter, and the second substrate.

Like the first exemplary embodiment, in the structure in which the cholesteric reflective plate 133 and the ¼ wavelength plate 173 are removed, and in the process in which the internal light emitted from the backlight unit 90 is changed into the left circular polarized light through the first polarizing plate 71, light loss of about 50% is generated. However the internal light of the set or predetermined polarization state may be reused by adding the cholesteric reflective plate 133 and the ¼ wavelength plate 173, thereby improving the light efficiency.

Figure 7:
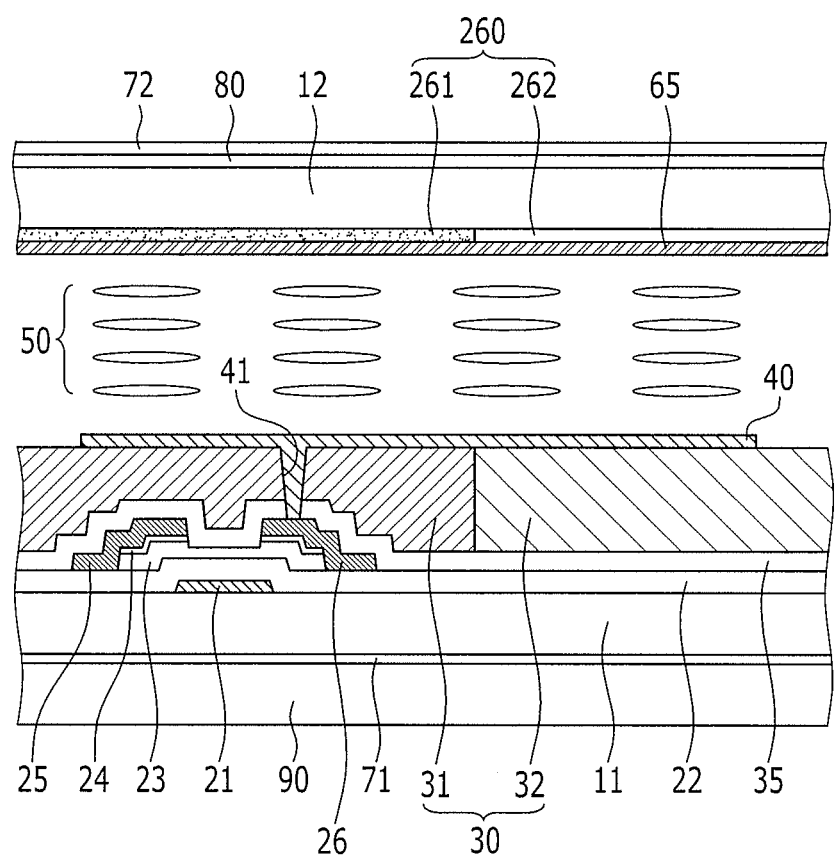
FIG. 7 is an enlarged cross-sectional view of a liquid crystal display (LCD) according to a third exemplary embodiment.

FIG. 7 is an enlarged cross-sectional view of a liquid crystal display (LCD) according to a third exemplary embodiment.

Referring to FIG. 7, a liquid crystal display (LCD) 102 has a similar structure to the liquid crystal display (LCD) 100 of the first exemplary embodiment. However, in the present exemplary embodiment, the diffusion plate is not additionally formed on the second substrate 12; but the present exemplary embodiment does include a color filter 260 formed with a first color filter 261 including light diffusion particles and a second color filter 262 where the light diffusion particles are not included.

As described above, when the external light is reflected by the reflective layer 31 of the cholesteric film 30, mirror reflection is generated such that the viewing angle may be decreased in the reflection of the external light. In the present exemplary embodiment, to compensate the viewing angle that is decreased by the mirror reflection, the first color filter 261 including the light diffusion particles is formed as a portion of the color filter.

A haze of the first color filter 261 is increased by this configuration, and accordingly the light passing through it is diffused at a wide angle such that the viewing angle is increased.

In the present exemplary embodiment, when considering the improvement of the viewing angle related to the external light reflected by the reflective layer 31 of the cholesteric film 30, the first color filter 261 including the light diffusion particles is formed corresponding to the reflective layer 31 of the cholesteric film 30, and the second color filter 262 without the light diffusion particles is formed corresponding to the transmissive layer 32 of the cholesteric film 30. However, the present invention is not limited thereto, and the size and position of both the first color filter 261 including the light diffusion particles and the second color filter 262 without the light diffusion particles may be variously changed. Also, when considering the efficiency of the light diffusion and a stable process, the second color filter, may be omitted and the color filter may include the light diffusion particles on the whole region.

Figure 8:
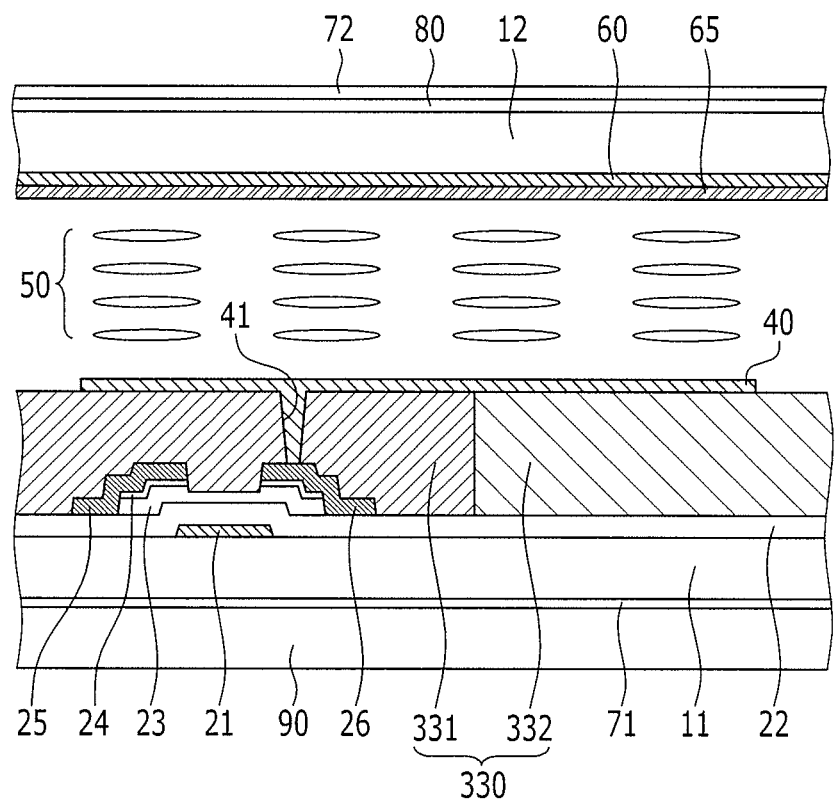
FIG. 8 is an enlarged cross-sectional view of a liquid crystal display (LCD) according to a fourth exemplary embodiment.

FIG. 8 is an enlarged cross-sectional view of a liquid crystal display (LCD) according to a fourth exemplary embodiment.

Referring to FIG. 8, a liquid crystal display (LCD) 103 has a similar structure to the liquid crystal display (LCD) 100 according to the first exemplary embodiment. However, in the present exemplary embodiment, a protective layer that is formed on the gate insulating layer 22 in the liquid crystal display (LCD) 100 of the first exemplary embodiment is not additionally formed, and a cholesteric film 330 has the function of the protective layer.

That is, the cholesteric film 330, including a reflective layer 331 and a transmissive layer 332, is directly formed on the gate insulating layer 22 by the manufacturing process described through FIG. 3A to FIG. 3C.

As described above, the protective layer is not separately formed, and the cholesteric film 330 has the function of the protective layer, and thereby the manufacturing process to form the transflective mode may be further simplified.

Figure 9:
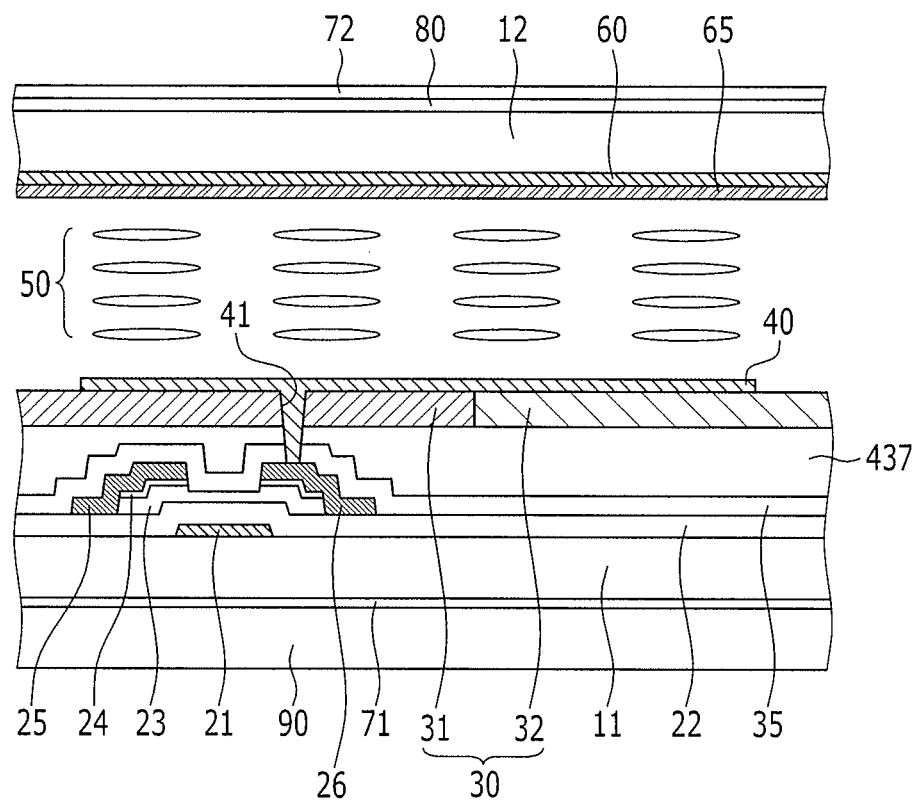
FIG. 9 is an enlarged cross-sectional view of a liquid crystal display (LCD) according to a fifth exemplary embodiment.

FIG. 9 is an enlarged cross-sectional view of a liquid crystal display (LCD) according to a fifth exemplary embodiment.

Referring to FIG. 9, a liquid crystal display (LCD) 104 has a similar structure to the liquid crystal display (LCD) 100 according to the first exemplary embodiment. However, an organic layer 437 is formed between the protective layer 35 and the cholesteric film 30 in the present exemplary embodiment.

That is, the present exemplary embodiment additionally forms the cholesteric film 30 to the conventional deposition structure of the protective layer 35 and the organic layer 437, and thereby a similar manufacturing process of the cholesteric film 30 to the manufacturing process of the organic layer 437 (without dramatically changing the manufacturing process of the organic layer 437) is used to realize the transflective mode of the liquid crystal display (LCD) 104.

Figure 10:
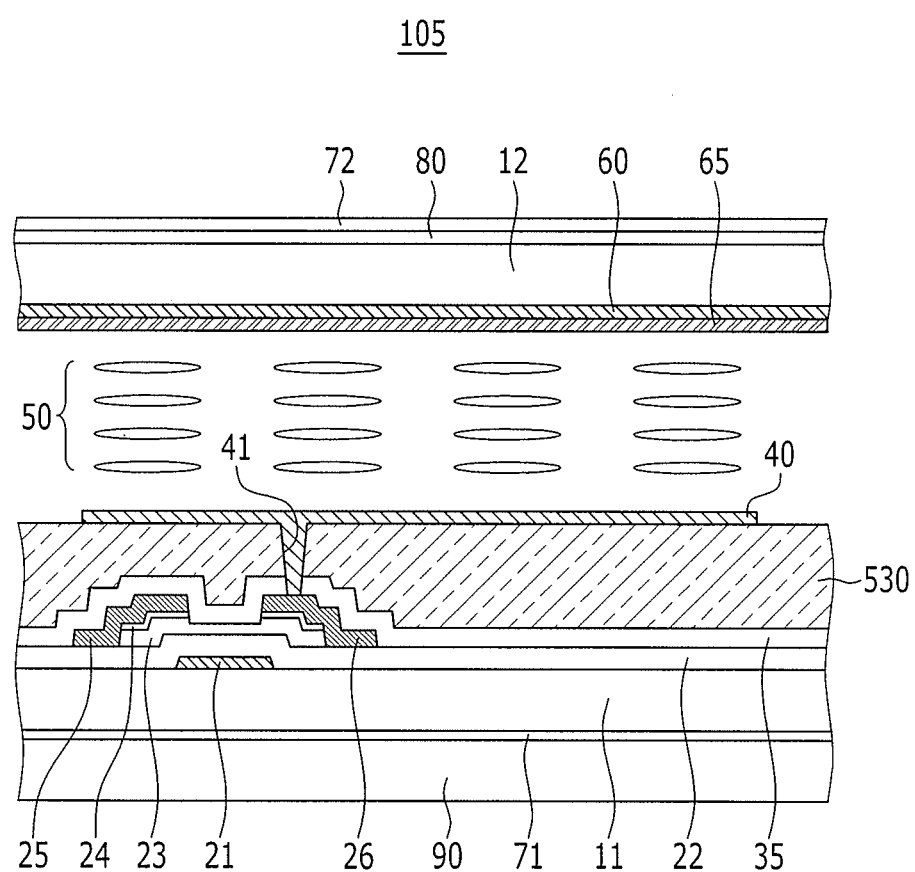
FIG. 10 is an enlarged cross-sectional view of a liquid crystal display (LCD) according to a sixth exemplary embodiment.

FIG. 10 is an enlarged cross-sectional view of a liquid crystal display (LCD) according to a sixth exemplary embodiment.

Referring to FIG. 10, the liquid crystal display (LCD) 105 has a similar structure to the liquid crystal display (LCD) 100 according to the first exemplary embodiment. However, in the present exemplary embodiment, a cholesteric film 530 only includes the reflective layer having the refractive index anisotropy, which is different from the first exemplary embodiment.

In the present exemplary embodiment, the ultraviolet (UV) light is irradiated and heat treatment is executed to the entire region of the reactive mesogen to form the cholesteric film 530, and thereby a reflective layer having refractive index anisotropy is formed on the entire region of the cholesteric film 530. Also, in the present exemplary embodiment, the cholesteric film 530 has reflectance of about 50%, as described above, and this reflectance of the cholesteric film 530 may be controlled by controlling the thickness of the cholesteric film 530.

As described above, the cholesteric film 530 in the present exemplary embodiment is different from the first exemplary embodiment such that the shape for realizing the transflective mode is changed, and this will be described hereafter.

Figure 11A:
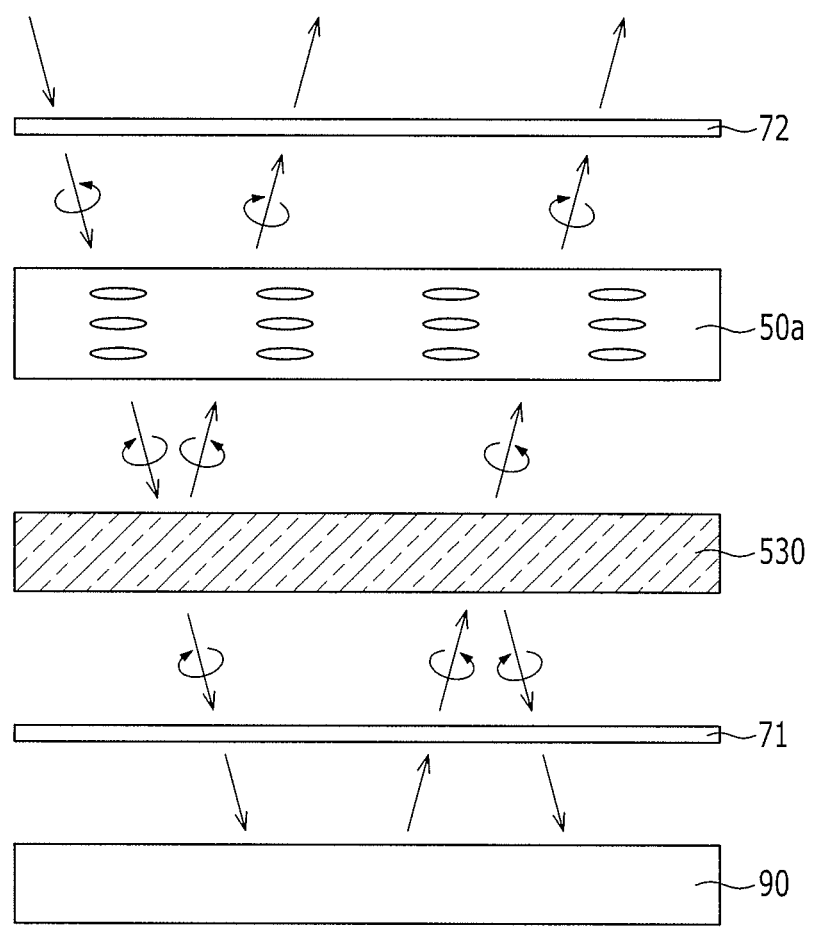
FIG. 11A and FIG. 11B are cross-sectional views schematically showing a reflective mode and a transmissive mode of a liquid crystal display (LCD) according to the sixth exemplary embodiment.
Figure 11B:
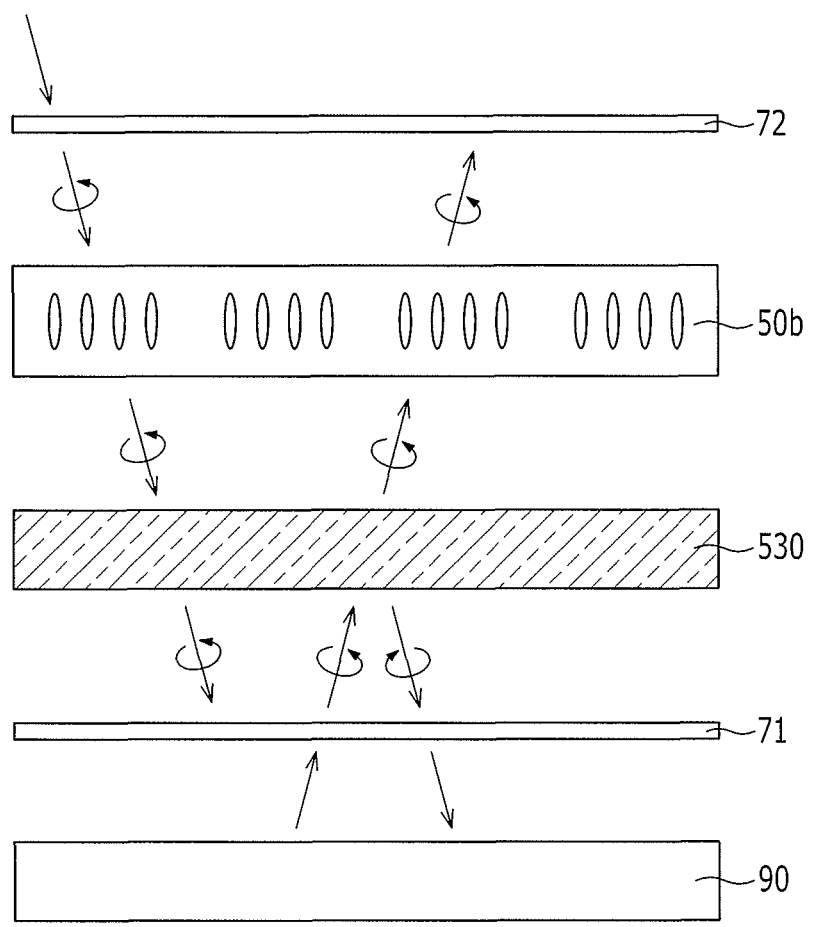

FIG. 11A and FIG. 11B are cross-sectional views schematically showing a reflective mode and a transmissive mode of a liquid crystal display (LCD) according to the sixth exemplary embodiment, and the operation of the transflective mode of the liquid crystal display (LCD) according to the present exemplary embodiment will be described.

In the present exemplary embodiment, like the first exemplary embodiment, the first polarizing plate 71 and the second polarizing plate 72 respectively change the incident light into the left circular polarized light and the right circular polarized light, and the reflective layer 31 of the cholesteric film reflects the left circular polarized light.

FIG. 11A shows the white state in which the liquid crystal layer 50a is horizontally aligned, wherein the left side is the path of the external light and the right side is the path of the internal light.

Firstly, referring to the path of the external light, a portion of the external light is changed into the right circular polarized light while passing through the second polarizing plate 72 positioned on the second substrate, and then is again changed into the left circular polarized light while passing through the liquid crystal layer 50a that is horizontally aligned between two substrates. As above described, the external light that is changed into the left circular polarized light while passing through the second polarizing plate 72 and the liquid crystal layer 50a accords the polarized light direction of the cholesteric film 530 such that it is reflected. In the present exemplary embodiment, it is set up that the reflectance of the reflective layer 31 is 50%. Thus, about 50% of the external light incident to the interior of the liquid crystal display (LCD) is reflected by the reflective layer 31, and the rest is passed through the cholesteric film 530.

When the external light is reflected by the reflective layer 31, the phase retardation is not generated and the external light that is reflected as the left circular polarized light is changed into the right circular polarized light while passing through the liquid crystal layer 50a. The external light that is changed into the right circular polarized light is passed through the color filter and the second substrate, and is emitted through the second polarizing plate 72 to the outside.

Referring to the path of the internal light, the internal light emitted from the backlight unit 90 disposed under the first substrate is changed into the left circular polarized light while a portion thereof is passed through the first polarizing plate 71. As described above, in the present exemplary embodiment, the reflectance of the cholesteric film 530 is about 50%, such that about 50% of the internal light arriving at the cholesteric film 530 is reflected from the cholesteric film 530 in the direction of the first polarizing plate 71, and the remainder of about 50% is transmitted through the cholesteric film 530.

The internal light transmitted through the cholesteric film 530 is changed into the right circular polarized light while passing through the liquid crystal layer 50a that is horizontally aligned, is then passed through the color filter and the second substrate, and is then emitted through the second polarizing plate 72 to the outside.

As described above, in the white state in which the liquid crystal layer 50a is horizontally aligned, the external light and the internal light pass through the second polarizing plate 72 and the first polarizing plate 71, and are reflected and transmitted through the cholesteric film 530 having reflectance of about 50% such that the external light and the internal light are both used in one pixel.

FIG. 11B is the black state in which the liquid crystal layer 50b is vertically aligned, wherein the left side is the path of the external light and the right side is the path of the internal light.

Referring to the path of the external light of the black state, a portion of the external light is changed into the right circular polarized light while passing through the second polarizing plate 72 positioned on the second substrate, and is passed as it is through the liquid crystal layer 50b that is vertically aligned between the two substrates without the phase retardation. As described above, the external light that is changed into the right circular polarized light while passing through the second polarizing plate 72 and the liquid crystal layer 50b, does not accord (correspond) with the polarization direction of the cholesteric film 530 such that it is transmitted as it is. On the other hand, the external light that is transmitted through the cholesteric film 530 as it is, is changed into the right circular polarized light such that it is not passed through the first polarizing plate 71.

Referring to the path of the internal light, the internal light from the backlight unit 90 positioned under the first substrate is changed into the left circular polarized light while a portion thereof is passed through the first polarizing plate 71. The internal light of the left circular polarized light is transmitted through the cholesteric film 530 as it is, and is also transmitted as it is through the liquid crystal layer 50b that is vertically aligned without the phase retardation. As described above, the internal light that is changed into the left circular polarized light while passing through the first polarizing plate 71 and the liquid crystal layer 50b, is not transmitted through the second polarizing plate 72 such that it is not emitted outside the second substrate.

In this way, the external light and the internal light are both not emitted to the side of the second substrate in the black state in which the liquid crystal layer 50b is vertically aligned such that the image is not realized.

As described above, differently from the cholesteric film 30 in which the reflective layer 31 and the transmissive layer 32 are additionally formed in the firsts exemplary embodiment, the single cholesteric film 530 that is capable of progressing both the reflection and the transmissions, is formed by controlling the reflectance such that the transflective mode may be realized while simplifying the internal structure. Therefore, the uniform cell gap may be maintained such that the light loss may be reduced and the reduction of the aperture ratio may be prevented.

Figure 12:
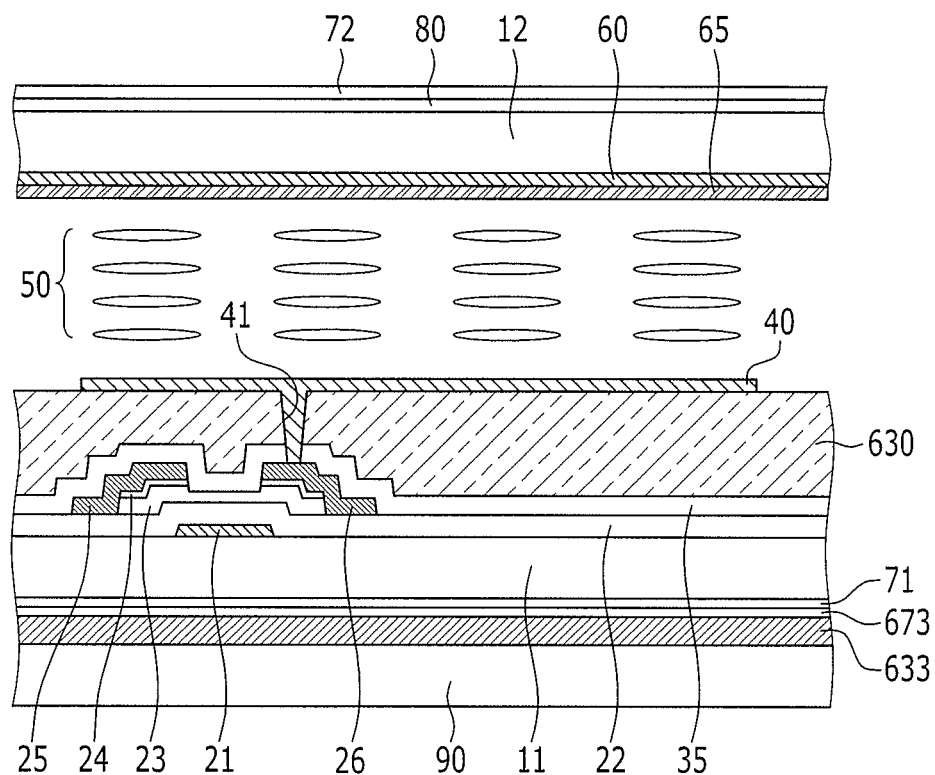
FIG. 12 is an enlarged cross-sectional view of a liquid crystal display (LCD) according to a seventh exemplary embodiment.

FIG. 12 is an enlarged cross-sectional view of a liquid crystal display (LCD) according to a seventh exemplary embodiment.

Referring to FIG. 12, a liquid crystal display (LCD) 106 has the same structure as the liquid crystal display (LCD) 105 according to the sixth exemplary embodiment except for a ¼ wavelength plate 673 and a cholesteric reflective plate 633 disposed under the first substrate 11. A cholesteric film 630 according to the present exemplary embodiment has the same configuration as that of the cholesteric film 530 according to the sixth exemplary embodiment.

The ¼ wavelength plate 673 and the cholesteric reflective plate 633 are disposed between the first polarizing plate 71 and the backlight unit 90, and the cholesteric reflective plate 633 is formed to have refractive index anisotropy throughout the entire region, like the cholesteric film 630. However, differently from the cholesteric film 630, the cholesteric reflective plate 633 has reflectance of 100%.

The light efficiency with which the incident light is transmitted through the cholesteric film 630 may be improved by the configuration further including the ¼ wavelength plate 673 and the cholesteric reflective plate 633, and this will be described in more detail.

Figure 13:
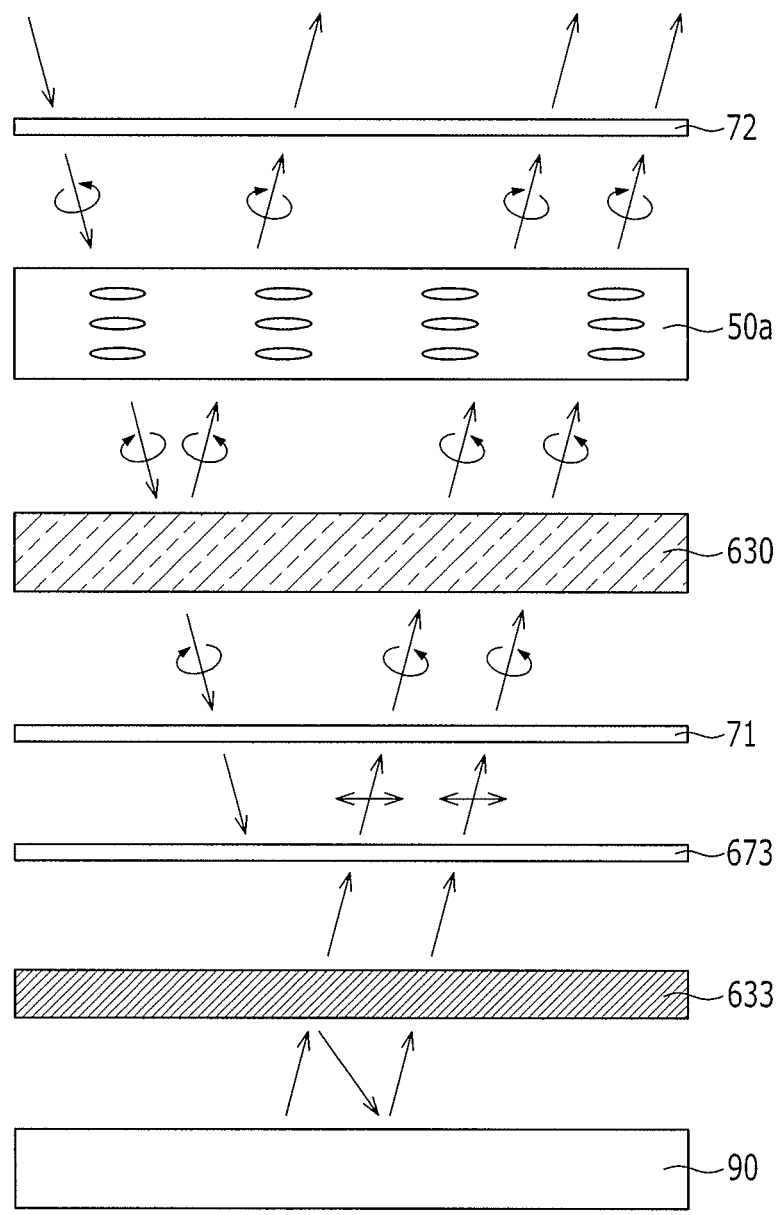
FIG. 13 is a cross-sectional view schematically showing a reflective mode and a transmissive mode of a liquid crystal display (LCD) according to the seventh exemplary embodiment.

FIG. 13 is a cross-sectional view schematically showing a reflective mode and a transmissive mode of a liquid crystal display (LCD) according to the seventh exemplary embodiment, and the operation of the transflective mode of the liquid crystal display (LCD) according to the present exemplary embodiment will be described.

In the present exemplary embodiment, like the sixth exemplary embodiment, the first polarizing plate 71 and the second polarizing plate 72 respectively change the incident light into the left circular polarized light and the right circular polarized light, and the cholesteric film 630 reflects the left circular polarized light with reflectance of about 50%.

FIG. 13 shows the white state in which the liquid crystal layer 50a is horizontally aligned, wherein the left side is the path of the external light, and the right side is the path of the internal light.

In the present exemplary embodiment, the second polarizing plate 72 and the cholesteric film 630 are the same as those of the sixth exemplary embodiment such that the path of the external light is the same as the path of the external light in the sixth exemplary embodiment.

In the present exemplary embodiment, referring to the path of the internal light, the internal light emitted from the backlight unit 90 is progressed toward the cholesteric reflective plate 633. In the present exemplary embodiment, the cholesteric reflective plate 633 has the characteristic of reflecting the left circular polarized light. Accordingly, the left circular polarized light among the internal light incident from the backlight unit 90 is again reflected to the backlight unit 90, and the remainder of the internal light is passed through the cholesteric reflective plate 633 as it is.

The portion of the left circular polarized light that is reflected by the cholesteric reflective plate 633 among the internal light, is reflected by the optical sheet disposed on the backlight unit 90 or by the backlight unit 90 itself such that it is again progressed toward the cholesteric reflective plate 633. In this process, the phase of the left circular polarized light is changed such that the internal light reflected by the backlight unit 90 or the optical sheet is transmitted through the cholesteric reflective plate 633. Here, the light that is reflected by the backlight unit 90 and is transmitted through the cholesteric reflective plate 633 is at a degree of about 30-50% of the left circular polarized light reflected by the cholesteric reflective plate 633.

The internal light that is passed through the cholesteric reflective plate 633 is changed into the linear polarized light of the same direction as the transmissive axis of the first polarizing plate 71, through the ¼ wavelength plate 673, and then is again changed into the left circular polarized light, through the first polarizing plate 71. As described above, ¼ the wavelength plate 673 allows the circular polymerized light that is transmitted through the cholesteric reflective plate 633, to be passed through the first polarizing plate 71 without the luminance loss.

In the present exemplary embodiment, the reflectance of the cholesteric film 630 is about 50% such that 50% of the internal light that arrives at the cholesteric film 630 is reflected by the cholesteric film 530 in the direction of the first polarizing plate 71, and the remaining about 50% is transmitted through the cholesteric film 630. For convenience, the internal light that is reflected from the cholesteric film 630 to the first polarizing plate 71 is not shown.

The internal light passing through the ¼ wavelength plate 173 and the first polarizing plate 71 is transmitted through the cholesteric film 630 as it is. The internal light passing through the cholesteric film 630 is changed into the right circular polarized light through the vertical aligned liquid crystal layer 50*a*, and is then emitted to the outside through the second polarizing plate 72 after passing through the color filter and the second substrate.

As shown in the present exemplary embodiment, the cholesteric reflective plate 633 and the ¼ wavelength plate 673 are added such that the internal light of the set or predetermined polarization state may be reused, and thereby the light efficiency may be improved.

Figure 14:
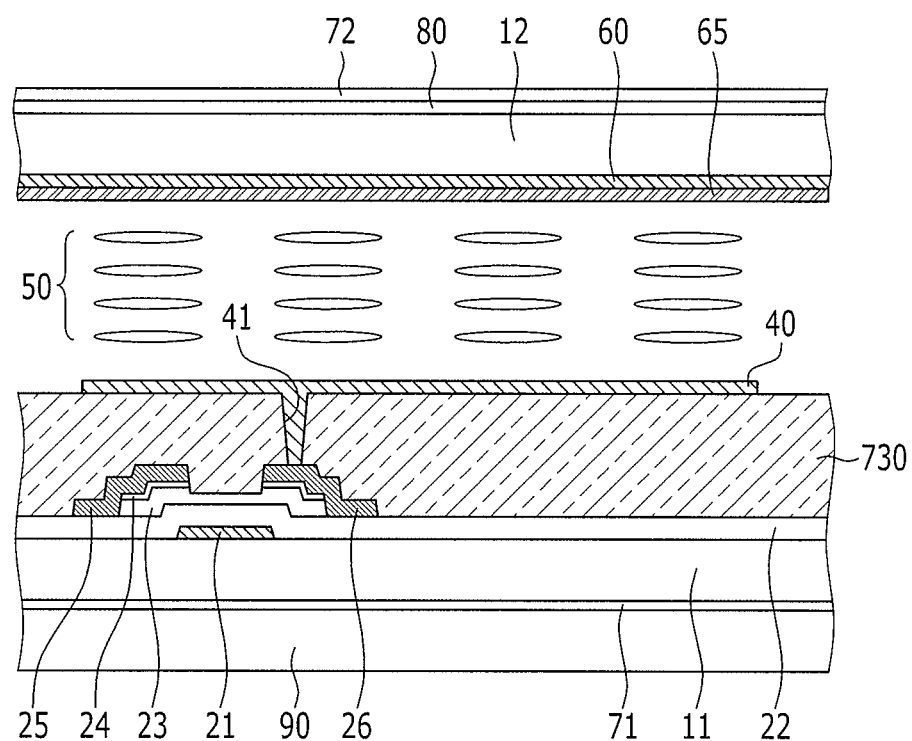
FIG. 14 is an enlarged cross-sectional view of a liquid crystal display (LCD) according to an eighth exemplary embodiment.

FIG. 14 is an enlarged cross-sectional view of a liquid crystal display (LCD) according to an eighth exemplary embodiment.

Referring to FIG. 14, a liquid crystal display (LCD) 107 is similar to the liquid crystal display (LCD) 105 of the sixth exemplary embodiment. However, in the present exemplary embodiment, the protective layer formed on the gate insulating layer 22 in the liquid crystal display (LCD) 105 of the sixth exemplary embodiment is not additionally formed, and the cholesteric film 730 has a function as the protective layer.

That is, the protective layer is not additionally formed and a cholesteric film 730 is formed directly on the gate insulating layer 22 to function as the protective layer, and thereby the manufacturing process to form the transflective mode may be further simplified.

As described above, the described technology has been described in connection with some exemplary embodiments. However, the present invention is not limited to the exemplary embodiments. The scope of the present invention is defined by the appended claims, and those having ordinary skill in the art will easily understand that the present invention may be modified in various ways without departing from the concept and scope of the claims.

| <Description of Certain Symbols> | |
|---|---|
| 100, 101, 102, 103, 104, 105, 106, 107: liquid crystal display (LCD) | |
| 11: first substrate | 12: second substrate |
| 15: sealing member | 20: thin film transistor |
| 21: gate electrode | 22: gate insulating layer |
| 23: semiconductor layer | 24: ohmic contact layer |
| 25: source electrode | 26: drain electrode |
| 30, 330, 530, 630, 730: cholesteric film | |
| 31, 331: reflective layer | 32, 332: transmissive layer |
| 35: protective layer | 40: pixel electrode |
| 41: via hole | 50: liquid crystal layer |
| 60, 260: color filter | 70: polarizing plate |
| 71: first polarizing plate | 72: second polarizing plate |
| 80: diffusion layer | 90: backlight unit |
| 133, 633: cholesteric reflective plate | 173, 673: ¼ wavelength plate |
| 437: organic layer | |

What is claimed is:

1. A liquid crystal display (LCD) comprising:
   a first substrate arranged with a thin film transistor and a pixel electrode connected to the thin film transistor;
   a second substrate arranged with a common electrode and a color filter and facing the first substrate;
   a liquid crystal layer between the first substrate and the second substrate;
   a first polarizing plate located at one side of the first substrate facing away from the second substrate;
   a second polarizing plate located at one side of the second substrate facing away from the first substrate;
   a cholesteric film on the first substrate, the cholesteric film comprising reflective layers adapted to reflect or transmit incident light as a function of a polarization direction and transmissive layers having a refractive index isotropy, the reflective layers and the transmissive layers being positioned adjacent one another according to an alternating pattern on the thin film transistor; and
   a backlight unit located at one side of the first polarizing plate facing away from the first substrate.

2. The liquid crystal display (LCD) of claim 1, wherein the reflective layer and the transmissive layer are located at an entire area of one pixel.

3. The liquid crystal display (LCD) of claim 1, wherein a reflectance of the reflective layer of the cholesteric film is 100%.

4. The liquid crystal display (LCD) of claim 1, wherein a reflectance of the cholesteric film is 50%.

5. The liquid crystal display (LCD) of claim 1, wherein the first polarizing plate and the second polarizing plate respectively change incident light into different circular polarization directions.

6. The liquid crystal display (LCD) of claim 1, wherein:
   the cholesteric film is disposed between the thin film transistor and the pixel electrode; and
   the cholesteric film has a hole to connect the thin film transistor and the pixel electrode.

7. The liquid crystal display (LCD) of claim 1, further comprising a protective layer on the thin film transistor.

8. The liquid crystal display (LCD) of claim 7, further comprising an organic layer on the protective layer.

9. The liquid crystal display (LCD) of claim 1, further comprising a diffusion layer between the second substrate and the second polarizing plate.

10. The liquid crystal display (LCD) of claim 1, wherein the color filter comprises light diffusion particles.

11. The liquid crystal display (LCD) of claim 1, wherein: the liquid crystal layer is an electrically controlled birefringence (ECB) mode liquid crystal layer, a vertical alignment (VA) mode liquid crystal layer, an optically compensated birefringence (OCB) mode liquid crystal layer, or a hybrid aligned nemaic (HAN) mode liquid crystal layer.

12. A liquid crystal display (LCD) comprising:
a first substrate arranged with a thin film transistor and a pixel electrode connected to the thin film transistor;
a second substrate arranged with a common electrode and a color filter and facing the first substrate;
a liquid crystal layer between the first substrate and the second substrate;
a first polarizing plate located at one side of the first substrate facing away from the second substrate;
a second polarizing plate located at one side of the second substrate facing away from the first substrate;
a cholesteric film on the first substrate;
a backlight unit located at one side of the first polarizing plate facing away from the first substrate; and
a ¼ wavelength plate and a cholesteric reflective plate disposed between the first polarizing plate and the backlight unit.

13. The liquid crystal display (LCD) of claim 12, wherein the reflectance of the cholesteric reflective plate is 100%.

14. A method for manufacturing a liquid crystal display (LCD), the method comprising:
forming a thin film transistor on a first substrate;
forming a cholesteric film on the thin film transistor, the cholesteric film comprising reflective layers for reflecting or transmitting incident light as a function of a polarization direction and transmissive layers having a refractive index isotropy, the reflective layers and the transmissive layers positioned adjacent one another according to an alternating pattern on the thin film transistor;
forming a hole in the cholesteric film;
forming a pixel electrode connected to the thin film transistor through the hole;
forming a color filter and a common electrode on a second substrate,
injecting a liquid crystal contacting the first substrate and the second substrate and between the first substrate and the second substrate;
disposing a first polarizing plate at one side of the first substrate facing away from the second substrate;
disposing a second polarizing plate at one side of the second substrate facing away from the first substrate; and
disposing a backlight unit at one side of the first polarizing plate facing away from the first substrate.

15. The method of claim 14, wherein the cholesteric film is formed by irradiating ultraviolet (UV) light to a reactive mesogen and by heat-treating it.

16. The method of claim 15, wherein the ultraviolet (UV) light is selectively irradiated to the reactive mesogen to form the reflective layer and the transmissive layer.

17. The method of claim 16, wherein the reflective layer and the transmissive layer are formed at an entire area of one pixel.

18. The method of claim 16, wherein the reflective layer and the transmissive layer are formed as part of a same layer in one pixel.

19. The method of claim 16, wherein the reflectance of the reflective layer is 100%.

20. The method of claim 14, wherein the reflectance of the cholesteric film is 50%.

21. The method of claim 14, Wherein a protective layer is formed on the thin film transistor.

22. The method of claim 14, wherein a diffusion layer is formed between the second substrate and the second polarizing plate.

23. The method of claim 14, wherein light diffusion particles are formed in the color filter.

24. A method for manufacturing a liquid crystal display (LCD), the method comprising:
forming a thin film transistor on a first substrate;
forming a cholesteric film on the thin film transistor;
forming a hole in the cholesteric film;
forming a pixel electrode connected to the thin film transistor through the hole;
forming a color filter and a common electrode on a second substrate,
injecting a liquid crystal contacting the first substrate and the second substrate and between the first substrate and the second substrate;
disposing a first polarizing plate at one side of the first substrate facing away from the second substrate;
disposing a second polarizing plate at one side of the second substrate facing away from the first substrate; and
disposing a backlight unit at one side of the first polarizing plate facing away from the first substrate,
wherein a ¼ wavelength plate and a cholesteric reflective plate are arranged between the first polarizing plate and the backlight unit.

25. The method of claim 24, wherein an organic layer is formed on a protective layer.

* * * * *

UNITED STATES PATENT AND TRADEMARK OFFICE
CERTIFICATE OF CORRECTION

PATENT NO. : 8,570,467 B2
APPLICATION NO. : 13/049754
DATED : October 29, 2013
INVENTOR(S) : Gee-Bum Kim et al.

It is certified that error appears in the above-identified patent and that said Letters Patent is hereby corrected as shown below:

In the Claims

Col. 16, line 39, Claim 1        Delete "lavers",
                                 Insert --layers--

Col. 17, line 8, Claim 11        Delete "nemaic",
                                 Insert --nematic--

Col. 18, line 19, Claim 21       Delete "Wherein",
                                 Insert --wherein--

Signed and Sealed this
Third Day of February, 2015

Michelle K. Lee
*Deputy Director of the United States Patent and Trademark Office*